No. 729,802. PATENTED JUNE 2, 1903.
C. E. SMITH & G. H. NEARING.
SNAP HOOK.
APPLICATION FILED MAR. 12, 1903.
NO MODEL.
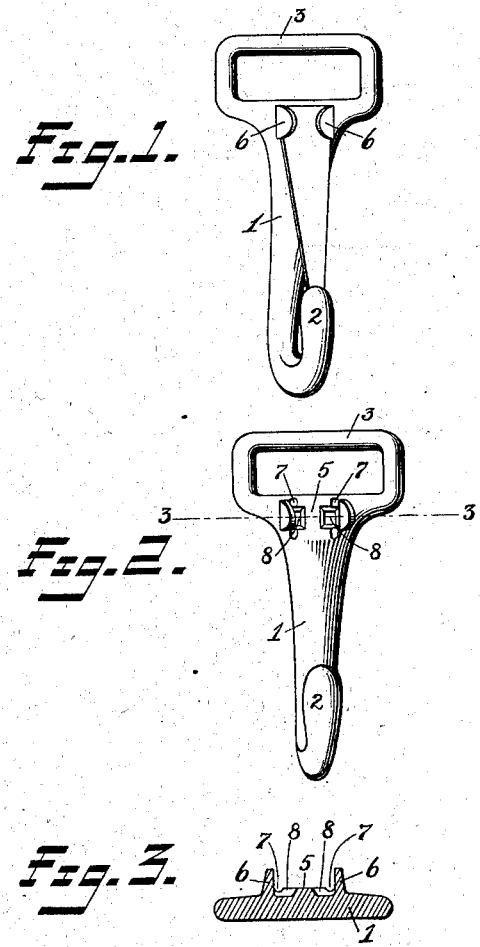
WITNESSES:
Geo. V. Rasmussen
INVENTORS:
Clarence E. Smith
George H. Nearing
BY
R. C. Mitchell
ATTORNEY.

No. 729,802.
Patented June 2, 1903.

UNITED STATES PATENT OFFICE.

CLARENCE E. SMITH AND GEORGE H. NEARING, OF NEW BRITAIN, CONNECTICUT, ASSIGNORS TO NORTH & JUDD MANUFACTURING COMPANY, OF NEW BRITAIN, CONNECTICUT, A CORPORATION OF CONNECTICUT.

SNAP-HOOK.

SPECIFICATION forming part of Letters Patent No. 729,802, dated June 2, 1903.

Application filed March 12, 1903. Serial No. 147,366. (No model.)

*To all whom it may concern:*

Be it known that we, CLARENCE E. SMITH and GEORGE H. NEARING, citizens of the United States, residing at New Britain, Hartford county, Connecticut, have invented certain new and useful Improvements in Snap-Hooks, of which the following is a full, clear, and exact description.

Our invention relates to snap-hooks, and particularly to that class of snap-hooks used in connection with horse-clothing, harness, hitch-straps, and other articles generally to which this article may be applied. Broadly speaking, the invention includes a body portion with a suitable means of fastening at one end and with a hook at the other end. The hook is provided with the usual hook-bill, and this bill overlaps a flat spring which at one end is securely and permanently fastened to the rear end of the body portion in such a manner as to cause the spring to press toward the hook-bill to normally close the passage into the hook.

The invention relates more particularly to the mode of fastening the spring to the body part.

Referring to the drawings, Figure 1 is a perspective view of a hook constructed in accordance with our invention. Fig. 2 is a similar view of the body portion before the spring is inserted. Fig. 3 is a cross-section of the body portion on the line 3 3, Fig. 2.

1 is the main body of the hook provided with the usual bill 2. The rear end of the hook may be fitted with any suitable means for fastening the hook to a blanket, strap, or other article to which the hook is to be connected, and in the particular embodiment shown this fastening means comprises a loop 3.

4 is a spring made of sheet metal and secured firmly and permanently at one end to the body 1. The free end of the spring when the parts are assembled normally presses toward the hook-bill 2, so as to close the passage into the hook. In the preferred form, although it is not essential to the broad idea of this invention, the spring is made tapering, so as to have a broad bearing at one end to press securely upon a supporting-platform 5 on the body portion, thus preventing twisting.

6 6 are lugs or ears formed on the body 1 and on each side of the spring-supporting platform 5.

7 7 are longitudinal grooves arranged adjacent to the ears 6 6 and into which the edges of the spring 4 project when the lugs or ears 6 6 are closed down on the spring.

8 8 are pockets or indentations slightly deeper than the grooves 7 7. When the spring is put in place on the platform and the ears 6 6 turned down, sufficient pressure is applied to crimp the spring down into the pockets 8 8 and also curl the edge of the spring into the grooves 7 7. The grooves thus answer a double purpose—to wit, preventing lateral motion of the spring and forming a base for the lugs 6 6 to admit of an easier bend. The purpose of the pockets 8 8 is to prevent end play of the spring. The combined holding qualities of the pockets 8 8 and grooves 7 7 and lugs 6 6 are to provide a simple, durable, and secure fastening for the spring to prevent it from becoming detached in all articles or intended use.

What we claim is—

1. In a snap-hook, a main body, a spring-supporting platform having cavities and grooves therein, integral retaining-lugs at each side of said platform, a sheet-metal spring supported by said platform and held against the same and projected slightly into said cavities and grooves by said retaining-lugs.

2. In a snap-hook, a main body, a spring-supporting platform having recesses therein, integral retaining-lugs at each side of said platform, a sheet-metal spring supported by said platform and held against the same and projected slightly into the said recesses by said retaining-lugs.

Signed at New Britain, Connecticut, this 10th day of March, 1903.

CLARENCE E. SMITH.
GEORGE H. NEARING.

Witnesses as to signature of Clarence E. Smith:
WALLACE R. CRAMER,
ROBT. J. NUSS.

Witnesses as to signature of George H. Nearing:
FREDK. M. HOLMES,
E. M. WIGHTMAN.